United States Patent [19]

Takayama et al.

[11] Patent Number: 5,244,751
[45] Date of Patent: Sep. 14, 1993

[54] PERPENDICULAR MAGNETIC RECORDING MEDIUM, ITS FABRICATION METHOD AND READ-WRITE MACHINE USING IT

[75] Inventors: Takanobu Takayama, Hachioji; Kazuetsu Yoshida, Kodaira, both of Japan

[73] Assignees: Hitachi, Ltd., Tokyo; Hitachi Maxell, Ltd., Osaka, both of Japan

[21] Appl. No.: 321,081

[22] Filed: Mar. 9, 1989

[30] Foreign Application Priority Data

| Mar. 11, 1988 | [JP] | Japan | 63-56078 |
| Sep. 30, 1988 | [JP] | Japan | 63-244561 |
| Dec. 26, 1988 | [JP] | Japan | 63-326376 |

[51] Int. Cl.$^5$ .............................................. G11B 5/66
[52] U.S. Cl. ..................................... 428/694; 428/611; 428/655; 428/668; 428/900; 428/928
[58] Field of Search ............... 428/694, 900, 611, 655, 428/668, 928

[56] References Cited

U.S. PATENT DOCUMENTS

| 4,726,988 | 2/1988 | Oka et al. | 428/695 |
| 4,987,039 | 1/1991 | Daimon et al. | 428/694 |

FOREIGN PATENT DOCUMENTS

| 3345531 | 6/1985 | Fed. Rep. of Germany . |
| 3620612 | 1/1987 | Fed. Rep. of Germany . |
| 140629 | 8/1984 | Japan . |
| 193123 | 10/1985 | Japan . |
| 057028 | 3/1986 | Japan . |
| 250826 | 11/1986 | Japan . |
| 189622 | 8/1987 | Japan . |
| 138519 | 6/1988 | Japan . |
| 183611 | 7/1988 | Japan . |
| 282913 | 11/1988 | Japan . |

OTHER PUBLICATIONS

IEEE Trans. Magn. Mag-14, p. 849 (1978).
Journal of the Japan Society of Applied Magnetics, vol. 11, No. 2 1987, p. 61.
Japanese Journal of Applied Physics vol. 23, No. 6, Jun. 1984 pp. L397-L399.

Primary Examiner—Paul J. Thibodeau
Assistant Examiner—R. Follett
Attorney, Agent, or Firm—Antonelli, Terry, Stout & Kraus

[57] ABSTRACT

There is disclosed a perpendicular magnetic recording medium having a magnetic layer comprising magnetic metal corpuscles and their oxide formed on a nonmagnetic substrate, and having perpendicular magnetic recording read-write characteristics improved by dispersing the above described magnetic metal corpuscles in the oxide crystal having a NaCl type crystal structure so that the magnetic metal corpuscles may have an isotropic structure instead of a columnar structure. There are also disclosed a method for fabricating such a perpendicular magnetic recording medium and a read-write machine using such a perpendicular magnetic recording medium. Further, there are disclosed a perpendicular magnetic recording medium having perpendicular magnetic recording read-write characteristics improved by applying heat treatment to the magnetic layer in a nonreducing atmosphere, a method for fabricating such a perpendicular magnetic recording medium and a read-write machine using such a perpendicular magnetic recording medium.

2 Claims, 10 Drawing Sheets sub.   50 nm metal corpuscle 1 oxide 2 film
sub.   50 nm 1
2

PERPENDICULAR MAGNETIC RECORDING MEDIUM, ITS FABRICATION METHOD AND READ-WRITE MACHINE USING IT

BACKGROUND OF THE INVENTION

The present invention relates to a magnetic recording medium obtained by forming a magnetic layer comprising a mixture of magnetic-metal corpuscles and their oxide on a nonmagnetic substrate, a fabrication method of the medium, and a read-write machine using the medium, and in particular to a magnetic recording medium suitable for a perpendicular magnetic recording medium having excellent magnetic characteristics, a fabrication method of the medium and a read-write machine using the medium.

In recent years, the recording density in the field of magnetic recording has been significantly increased. In particular, the perpendicular magnetic recording method has a feature that self-demagnetization is decreased as the recording density is increased unlike the longitudinal magnetic recording method. The perpendicular magnetic recording method thus attracts public attention and is now being studied energetically.

With regard to perpendicular magnetic recording media, characteristics of Co-Cr alloys are discussed by S. Iwasaki and K. Ouchi in IEEE Trans., Magn., MAG-14, p. 849 (1978), for example. Co-Cr alloys are large in both magnetic anisotropy and saturation magnetization and have excellent characteristics as perpendicular magnetic recording media. However, Co-Cr alloys have a problem that they tend to be worn away because they are metals. In view of this, Co-CoO evaporated films comprising a mixture of Co and its oxide are studied and perpendicular magnetic films having large magnetic anisotropy are obtained as described in JP-A-59-140629, for example. Further, perpendicular magnetic recording media using partially oxidized Fe-Co films are also now studied vigorously as described in Journal of the Japan Society of Applied Magnetics, Vol. 11, No. 2, 1987, p. 61.

SUMMARY OF THE INVENTION

In case of the above described Co-CoO evaporated films and partially oxidized Fe-Co films, perpendicular magnetic films are obtained in a range of saturation magnetization of $10^3$ kA/m or less. When reading and writing operation is actually performed by using a magnetic head, however, the level of the reproduced output is low.

The Co-CoO films and partially oxidized Fe-Co films provide only insufficient characteristics as magnetic recording media.

If these magnetic metals are partially oxidized for the purpose of improving the wear resistance during sliding with respect to the magnetic head, an effect is surely perceived to some degree. As described above, however, the reproduced output is insufficient. Therefore, a further improvement of characteristics has been desired.

The present invention aims at solving this problem. A first object of the present invention is to provide an improved perpendicular magnetic recording medium for practical use having a high read-write characteristics. A second object of the present invention is to provide a production method of the medium. A third object of the present invention is to provide a read-write machine using the medium.

The above described object of the present invention is achieved by a perpendicular magnetic recording medium comprising a non-magnetic substrate, and a magnetic layer so formed on the substrate as to include magnetic-metal corpuscles and their oxide, the magnetic-metal corpuscles being dispersed in an oxide crystal of the magnetic-metals having an NaCl type crystal structure, growth of crystal particles being restrained so as to prevent generation of a columnar structure and so as to generate an isotropic structure.

Desirable features are enumerated as follows.

(1) In accordance with a feature of the present invention, the minor axis and the major axis of the above described magnetic-metal corpuscle are respectively 4 to 30 nm, and more preferably 4 to 20 nm and 5 to 40 nm, and more preferably 5 to 25 nm in length, and the volumetric content of the magnetic-metal corpuscles contained in the magnetic layer is 20 to 85%. The ratio in length of the major axis to the minor axis is 1.0 to 10.0, and more preferably 1.0 to 5.0. Further, a more preferred content of metal corpuscles is 45 to 75%. From the viewpoint of wear resistance, a larger content of oxide is preferred. From the viewpoint of magnetic characteristics, a smaller content of oxide is preferred. From both of these relations, a desirable value of the above described content is defined.

(2) In accordance with another feature of the present invention, the above described magnetic-metal corpuscle comprises at least one kind selected from the group consisting of cobalt, iron, nickel and their alloys, and the above described oxide of the magnetic-metal corpuscle comprises at least one kind of metal oxide selected from the group consisting of cobalt oxide, iron oxide, nickel oxide and their mixed crystals.

(3) In accordance with another feature of the present invention, <111> direction of oxide corpuscles contained in the magnetic film is dominant in perpendicular direction to a face of the magnetic film.

Materials constituting the magnetic layer may comprise an adjusting agent to set its magnetic property (coercive force) with respect to the magnetic head at a predetermined value. That is to say, the magnetic layer may comprise 0.1 to 10 at. % metal such as Ti, Al, Mn, Ta, Nb or Zr in order to decrease the coercive force or may comprise 0.1 to 10 at. % metal such as W, Mo, Pt, Ru or Re in order to increase the coercive force.

In Co-CoO evaporated films reported hitherto, metal corpuscles form a columnar structure in the oxide. And it is said that the columnar structure is a main course of occurrence of perpendicular magnetic anisotropy as described in "A New Perpendicular Magnetic Film of CoO by Evaporation" by K. Nakamura, N. Tani, et al., Japanese Journal of Applied Physics, Vol. 23, No. 6, June 1984, pp. L397–L399. In such a prior art example, however, ferromagnetic corpuscles enlarge or adjacent corpuscles come in contact each other in a region of saturation magnetization Ms above 5 to 600 kA.m. As a result, magnetic interaction in the in-plane direction of the film is strengthened. Accordingly, a thin film having sufficient perpendicular magnetic anisotropy as a perpendicular magnetic recording medium is not obtained.

Co-CoO evaporated films described herein are Co-CoO evaporated films described in the literature of the prior art and have non-stoichiometric composition represented by CoOx ($0 < x < 1$). Microscopically, Co- CoO evaporated films are presumed to be in a state in which metal Co and cobalt monoxide (CoO) are mixed.

In accordance with the present invention, the size of ferromagnetic metal corpuscle is made minute in the direction of the magnetic film thickness as well to prevent the columnar growth of ferromagnetic metal corpuscles. As a result, the perpendicular magnetic anisotropy is large even in the region of saturation magnetization Ms above 5 to 600 kA/m as described later with reference to embodiments. Even in the read-write operation actually using the magnetic head, favorable characteristics we have never had are obtained.

Such partially oxidized films are made by using the same apparatus as that of the prior art and evaporating and depositing magnetic metal such as Co, Fe or Ni in the oxygen atmosphere. However, the vapor deposition speed of the above described ferromagnetic is made as slow as 50 nm/sec or less, which is significantly slower than approximately 100 nm/sec of the prior art example, or practically 30 to 0.3 nm/sec so that the oxidized film may be formed before metal corpuscles grow up. In the partially oxidized film formed by using such a method, the ferromagnetic metal corpuscle does not have a columnar shape of the prior art example as described later with reference to embodiments. Instead, grains each having major axis length of not longer than 40 nm, or preferably not longer than 25 nm are dispersed in a matrix form. The perpendicular magnetic recording medium has favorable read-write characteristics we have never had.

The definite reason why the magnetic film having a structure in which metal corpuscles are dispersed in the oxide instead of the columnar structure has favorable perpendicular magnetic recording characteristics is not clear, but is considered as follows.

FIG. 1 schematically shows the microscopic structure of the cross-section of the magnetic layer of a perpendicular magnetic recording medium produced in accordance with the present invention. The magnetic layer has such a structure that ferromagnetic corpuscles 1 are dispersed in oxide 2. There is little configuration factor causing perpendicular magnetic anisotropy as the whole thin film. Since favorable perpendicular magnetic recording characteristics are actually exhibited, however, it is guessed that the magnetic anisotropy in the vertical direction is predominant in a metal corpuscle or a microscopic region including the metal corpuscle and its surroundings. The reason why perpendicular magnetic anisotropy is generated in that microscopic region is not clear. Although it is not clear, it is presumed that perpendicular magnetic anisotropy is generated by exchange interaction between ferromagnetic metal corpuscles and antiferromagnetic oxide corpuscles. This is because magnetic characteristics are especially excellent in the case that the <111> direction of oxide corpuscles such as CoO, FeO, NiO or their mixture crystals contained in the magnetic film is dominant in perpendicular direction to a face of the magnetic film.

Further, it was generally said that the value of perpendicular magnetic anisotropy energy (Ku) had to satisfy the condition $Ku > 2\pi M_s^2$ or a condition close to that with respect to the shape magnetic anisotropy energy $2\pi M_s^2$ of the thin film where Ms is saturation magnetization in order to realize a perpendicular magnetic recording. In perpendicular magnetic recording media such as Co-Cr realized hitherto, therefore, a columnar structure perpendicular to the magnetic film face is formed, and the condition $Ku > 2\pi M_s^2$ or a condition close to that is satisfied by a multiplicative effect of the magnet crystalline anisotropy and the shape magnetic anisotropy caused by the columnar structure. Because favorable read-write characteristics are not obtained in a medium which does not satisfy this condition.

In perpendicular magnetic recording media produced in accordance with the present invention, perpendicular magnetic recording is possible and favorable read-write characteristics we have never had are obtained even though the value of perpendicular magnetic anisotropy energy (Ku) is approximately 0.6 times the shape anisotropy energy $(2\pi M_s^2)$ in case of a medium having saturation magnetization Ms of 1200 kA/m, for example. In the perpendicular magnetic recording medium obtained in accordance with the present invention, the perpendicular magnetic anisotropy energy (Ku) becomes smaller than the shape anisotropy energy $(2\pi M_s^2)$ in a region of large saturation magnetization. Nevertheless, magnetic domains tend to be formed perpendicularly to a film plane as shown in FIG. 2 in actual perpendicular magnetic recording. This is the reason why favorable read-write characteristics are obtained. In FIG. 2, a large arrow 3 represents the direction of recorded magnetization, and a small arrow 3 represents the magnetization direction of a magnetic-metal corpuscle 1. It is guessed that the property that magnetic domains tend to be formed in the direction perpendicular to the film face is caused by the unique structure of the perpendicular magnetic recording medium according to the present invention in which metal corpuscles as shown in FIG. 1 are dispersed in the oxide.

Further, the above described first object is achieved by a perpendicular magnetic recording medium having a perpendicular magnetic anisotropy including at least a mixture of cobalt and its oxide formed directly on or via a high permeability layer on a nonmagnetic substrate having a predetermined shape, a magnetization curve measured by applying a magnetic field in a direction perpendicular to a film face of the magnetic film satisfying the condition that a first tangential line drawn with respect to a demagnetization curve of the magnetization curve in the first quadrant in the vicinity of zero applied field intersects a shoulder section of the demagnetization curve, or a value $R = S/M$ obtained by dividing S by saturation magnetization does not exceed 10 kA/m, where S is an area of a region surrounded by a second tangential line drawn with respect to the demagnetization curve in high applied field region, the first tangential line and the shoulder section of the demagnetization curve.

That is to say, the present inventors found that the fact that the magnetization curve measured by applying a magnetic field in a direction perpendicular to the magnetic film face had a specific shape as described above was extremely effective. The present invention is based upon this finding. The shape of the magnetization curve which becomes a primary factor of improvement of the characteristics will now be described by referring to the drawing.

FIGS. 8 and 9 show typical magnetization curves of the magnetic film according to the present invention measured in the perpendicular direction. FIG. 10 shows an example of a perpendicular magnetic film of the prior art.

In the perpendicular magnetic film of the prior art shown in FIG. 10, a shoulder section 24 of a demagnetization curve 26 on a magnetization curve, measured while the magnetic field is being weakened, has a roundish shape. In the shoulder section, magnetization inversion occurs extremely gradually.

In case of the magnetization curve of the perpendicular magnetic film according to the present invention shown in FIG. 8, a first tangential line 21 drawn with respect to the demagnetization curve nearly at zero applied field and a shoulder section 22 of the demagnetization curve 26 intersect each other, and the shoulder section 22 exists in allow magnetic field region located on the left side of the first tangential line 21. Even in case the shoulder section 22 is not present on the left side of the first tangential line 21, the demagnetization curve in a shoulder section 23 exists extremely near the intersecting point of the first tangential line 21 drawn near zero applied field and a second tangential line 25 drawn in high applied field region.

Assuming that the shoulder section 23 or 24 exists on the right side of the first tangential line 21 and the area of a region surrounded by the first tangential line 21, the second tangential line 25 and the shoulder section 23 or 24 of the demagnetization curve is S, the present inventors have found that the smaller the value $R = S/Ms$ obtained by dividing S by the saturation magnetization Ms becomes the more excellent the read-write characteristics become and $R = 10$ kA/m or less (including zero) is favorable for practical use as described above. (Hereafter, a magnetic curve having such a shape that the first tangential line 21 and the shoulder section of the demagnetization curve 26 intersect each other is referred to as type A. A magnetization curve having a value of R of 0 to 10 kA/m is referred to as type B. And a magnetization curve having a value of R exceeding 10 kA/m is referred to as type C.) Therefore, it is known that the R value of FIG. 10 described before is significantly larger than that of FIG. 9. The area S can be easily derived from the first or second tangential line 21 or 25 and the demagnetization curve of the shoulder section 23 or 24. A feature common to perpendicular magnetic films shown in FIGS. 8 and 9 is that the shoulder sections 22 and 23 of the magnetization curve (demagnetization curve) have extremely sharp square shapes and the magnetization inversion in these sections is extremely steep.

The detailed reason why the read-write characteristics are improved by using a perpendicular magnetic film is not clear, but is guessed as follows. A feature of a perpendicular magnetic film according to the present invention is that the shoulder section of the magnetization curve has a sharp square shape as shown in FIGS. 8 and 9. As described before, this indicates that magnetization inversion occurs extremely sharply. It is considered that the spatial resolution obtained when magnetic recording is performed in a magnetic recording medium having such characteristics is improved and this results in improvement of recording density characteristics and significant improvement of reproduced output.

The second object of the present invention is achieved by a method for fabricating a magnetic recording medium, comprising the steps of evaporating magnetic-metal grains in an atmosphere containing oxygen gas and forming a magnetic layer including magnetic-metal corpuscles and oxide thereof on a nonmagnetic substrate by using vapor deposition, the magnetic layer being formed by vapor deposition at a speed of 50 nm/sec or less.

It is preferred that the above described magnetic-metal corpuscle comprises at least one kind selected out of a group including cobalt, iron, nickel and their alloys. As occasion demands, however, other metal elements capable of increasing and decreasing the coercive force may be added in order to adjust the coercive force according to characteristics of the magnetic head.

The magnetic layer can be easily formed by vapor deposition using the well-known electron-beam melting or sputtering in a plasma generation apparatus using application of radio-frequency power or microwave power. The oxide can be formed with a predetermined oxygen content by adjusting the partial pressure of oxygen gas in the film forming atmosphere. Further, the vapor deposition speed, i.e., the magnetic layer forming speed can be arbitrarily controlled by adjusting inputted power. The magnetic layer forming speed is more preferably 30 to 0.3 nm/sec, or further more preferably 3.0 to 0.3 nm/sec. A speed slower than 0.3 nm/sec may also be used. However, a too slow speed is not practical because a fairly long time is needed to form a requisite film thickness. The value of the coercive force ($HC\perp$) of the magnetic layer in the direction perpendicular to the film face tends to become larger as the forming speed is decreased. From the viewpoint of industrial productivity, however, the above described preferred speed is set.

Further, the above described second object is achieved by applying heat treatment to a Co evaporated film formed by the prior art preferably at a temperature of not lower than 100° C., and not higher than 300° C. The atmosphere at the time of heat treatment may be either air or vacuum. Further, a processing time not shorter than 30 minutes is sufficient at the predetermined temperature.

The definite reason why the read-write characteristics are improved by the heat treatment is not clear, but is guessed as follows.

FIG. 19 shows magnetization curves of a Co-CoO evaporated film obtained before and after the heat treatment in the air. As compared with a magnetization curve 31 obtained before heat treatment, the squareness of the shoulder section of a magnetization hysteresis curve 32 is significantly improved by performing heat treatment. This indicates that magnetization inversion occurs steeply as a result of heat treatment. It is considered that such improvement of magnetic characteristics has brought about improvement of recording resolution and reproduced output in actual read-write operation.

Further, the reason why the shape of the magnetization hysteresis curve thus changes is considered as follows. The Co-CoO evaporated film fabricated by the prior art has such a structure that a crystallite of metal cobalt is covered by CoO oxide. It is considered that oxygen of supersaturation exists in the crystallite of metal cobalt and causes large distortion in the crystallite, resulting in poor uniformity. It is considered that magnetization inversion of metal Co in the film is not performed uniformly therefore. On the other hand, it is considered that heat treatment applied to such a film at a temperature of not lower than 100° C., and not higher than 300° C. disperses oxygen of supersaturation in metal Co and forms stable CoO oxide at the surface of the metal Co crystallite. Further, it is considered that as a result the oxygen content in metal Co is decreased, and crystallinity of Co crystallite is improved, magnetization inversion of Co crystallite being performed uniformly in the film.

Further, the above described second object is achieved by a method for fabricating a perpendicular magnetic recording medium, comprising the steps of forming a magnetic film on a nonmagnetic substrate by evaporating metal grains including at least cobalt in an atmosphere containing oxygen, the magnetic film including Co-CoO mixed corpuscles and having saturation magnetization Ms of 400 to 1200 kA/m, and more preferably 600 to 1100 kA/m, and applying heat treatment to the magnetic film in a nonreducing atmosphere at a temperature of 150 to 220° C.

The above described adjustment of saturation magnetization Ms can be arbitrarily controlled in accordance with a well-known method by adjusting the partial pressure of oxygen in the atmosphere during vapor deposition. The nonmagnetic substrate during vapor deposition may be kept at normal temperature. However, it is preferred that the nonmagnetic substrate is kept at 30° to 50° C. High temperature exceeding 80° C. such as 100° C. is not desirable because improvement of characteristics is not promising.

This magnetic film can be fabricated by setting the range of saturation magnetization Ms at 400 to 1200 kA/m, and more preferably at 600 to 1100 kA/m under the condition that the substrate temperature at the time of film forming is not higher than 80° C., and more preferably 30° to 60°. By applying heat treatment to such a magnetic film in a nonreducing atmosphere such as air or inert gas like nitrogen gas at a temperature ranging from 150° to 220° C., the shape of the shoulder section of the magnetization curve becomes more square, and the read-write characteristics can be improved. Especially for a magnetic film having saturation magnetization Ms ranging from 400 to 600 kA/m, this heat treatment is indispensable and extremely effective. It is a matter of course that this heat treatment is effective for a magnetic film having Ms of not less tan 600 kA/m as well. In case of a magnetic film having such a large value of Ms, however, heat treatment may be omitted.

The third object of the present invention is achieved by a magnetic read-write machine comprising a magnetic recording medium, drive means for making the magnetic recording medium travel, a magnetic head for writing information onto the magnetic recording medium, a reproduced head, and the above described magnetic recording medium comprising the magnetic recording medium capable of achieving the first object of the present invention.

By using an optical head comprising optical means utilizing the Farady effect or the Kerr effects, for example, instead of a magnetic head as the reproduced head, it is possible to realize an optical magnetic read-write machine having a high density and a high transfer speed.

Assuming that a magnetic thin film according to the present invention is used as a recording medium in an optical magnetic recording machine, function of each component will now be described. FIG. 21 shows an example of an optical magnetic recording machine according to the present invention. This example utilizes the property of the perpendicular magnetization film that the light transparency is increased when the saturation magnetization is not larger than approximately 800 kA/m. First of all, a magnetic film is formed on a substrate 14 having high transparency, resulting in a recording medium. This recording medium travels at a constant speed (v). When the recording medium passes a magnetic head 10, signals are recorded on the basis of a principle which is the same as that of magnetic recording. At this time, a signal is recorded as upward or downward magnetization as indicated by arrows by using large perpendicular magnetic anisotropy of the magnetic film. Signal information is then read out by using the Faraday effect. That is to say, a light beam 12 linearly polarized in a polarizer 11 is focused to a point in the magnetic film to enter the magnetic film in the perpendicular direction. The light is transmitted through the magnetic film to arrive at the rear face of the substrate. At this time, the polarized plane of light is rotated according to the upward or downward magnetization. This rotation of the polarized plane is read by an analyzer 13 and is converted into an electrical signal, the signal being thus read out.

The above described optical magnetic read-write system utilizes the property that a perpendicular magnetization film according to the present invention easily transmits light. Further, the reason why the magnetic head is used for signal recording is that the Curie point of the magnetic film is not less than 300° C. and the thermal recording scheme using laser heating used in conventional optical magnetic recording cannot be adopted.

If a method of reading signals by the Kerr effect using light reflection is employed instead of the method shown in FIG. 21, even a magnetic film which does not transmit light can be used as a recording medium.

DESCRIPTION OF THE PREFERRED EMBODIMENTS

Embodiments of the present invention will now be described.

Embodiment 1

Figure 20:
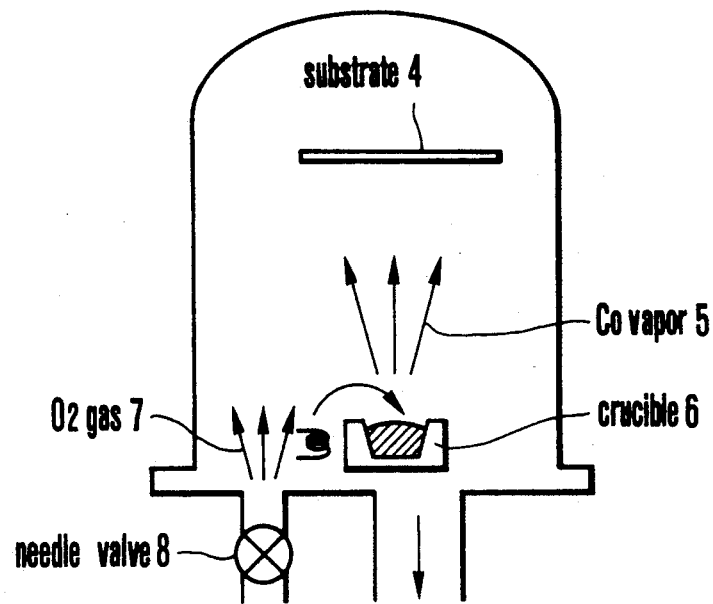
FIG. 20 is a schematic sectional view of an electron beam heating evaporation apparatus used for fabricating magnetic recording media of the present invention.

A Co-CoO evaporated film was formed on a polyimide substrate 4 by using a vacuum evaporation apparatus shown in FIG. 20. By using an electron beam heating evaporation source 6, Co was solved and evaporated. Introduction of oxygen gas for performing partial oxidization was adjusted by using a needle valve 8.

In order to study the evaporation speed used for forming Co-CoO evaporated films, magnetic layers comprising Co-CoO evaporated films with thickness of 200 nm were fabricated under the condition that the substrate temperature was fixed to 30° C. and the evaporation speed of Co was set at 0.3, 3, 30 and 100 nm/sec. The partial pressure of oxygen in evaporation was so adjusted in a range from $5.2 \times 10^{-4}$ Pa to $1.3 \times 10^{-1}$ Pa that saturation magnetization Ms of evaporated films thus formed may have an identical value of approximately 1000 kA/m. Table 1 shows values of coercive force Hc⊥ of these evaporated films measured in the direction perpendicular to the film face by using a vibrating sample magnetometer (perpendicular coercive force) and values of perpendicular magnetic anisotropy energy Ku thereof measured by using a torque magnetometer.

TABLE 1

| | Evaporation Speed (nm/sec) | Perpendicular Coercive Force Hc⊥ (kA/m) | Perpendicular Magnetic Anisotropy Energy Ku (J/m³) |
|---|---|---|---|
| Embodi- | 0.3 | 140 | $4.6 \times 10^5$ |

TABLE 1-continued

| | Evaporation Speed (nm/sec) | Perpendicular Coercive Force Hc⊥ (kA/m) | Perpendicular Magnetic Anisotropy Energy Ku (J/m³) |
|---|---|---|---|
| ments | 3.0 | 110 | $4.1 \times 10^5$ |
| | 30 | 86 | $3.6 \times 10^5$ |
| * | 100 | 48 | $2.7 \times 10^5$ |

*Example to be compared (prior art example)

In case the evaporation speed of Co was 100 nm/sec of the prior art, the perpendicular coercive force (Hc⊥) was 48 kA/m, and the value of perpendicular magnetic anisotropy energy Ku was $2.7 \times 10^5$ J/m³. In this case, the value of the perpendicular magnetic anisotropy energy Ku does not exceed half of shape anisotropy energy $2\pi M_s^2$ caused by a thin film. Even if recording was actually attempted by using a magnetic head, therefore, the reproduced output was very low.

When the evaporation speed of Co was decreased, values of the perpendicular coercive face Hc⊥ and perpendicular magnetic anisotropy energy Ku significantly increased. Especially when the evaporation speed of Co was set at 0.3 nm/sec, the perpendicular coercive force Hc⊥ became as large as 140 kA/m and the perpendicular magnetic anisotropy energy Ku became as large as $4.6 \times 10^5$ J/m³. In this case, the perpendicular magnetic anisotropy energy Ku was approximately 0.7 times as large as the in-plane shape anisotropy energy $2\pi M_s^2$. When recording was actually attempted by using a magnetic head, magnetization was recorded in the direction perpendicular to the film face, and favorable read-write characteristics we had never had were obtained as described later.

Under the evaporation condition that the substrate temperature and the evaporation speed of Co were respectively fixed to 30° C. and 0.3 nm/sec and the oxygen introducing pressure before evaporation were changed between 2 mPa and 20 mPa, Co-CoO evaporated films having values 330, 520, 600, 850, 1000 and 1200 kA/m of saturation magnetization Ms were fabricated. In all cases, the film thickness was approximately 200 nm. Table 2 shows magnetic characteristic values of these partially oxidized Co films measured by using a vibrating sample magnetometer.

TABLE 2

| Sample No. | Saturation Magnetization Ms (kA/m) | In-plane Coercive Force Hc∥ (kA/m) | Perpendicular Coercive Force Hc⊥ (kA/m) | Perpendicular Squareness Ratio (Mr/Ms)⊥ |
|---|---|---|---|---|
| C-1 | 330 | 32.6 | 41.4 | 0.10 |
| C-2 | 520 | 38.2 | 97.1 | 0.19 |
| C-3 | 600 | 39.4 | 99.5 | 0.17 |
| C-4 | 850 | 55.7 | 139.3 | 0.18 |
| C-5 | 1000 | 34.6 | 88.3 | 0.12 |
| C-6 | 1200 | 23.9 | 93.1 | 0.24 |

Figure 1:
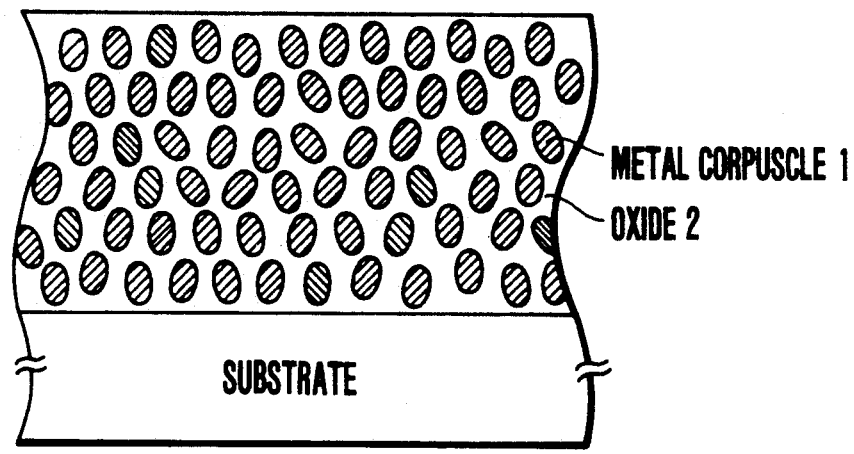
FIG. 1 is a schematic view of a microscopic structure showing the sectional structure of a perpendicular magnetic recording medium according to the present invention.
Figure 2:
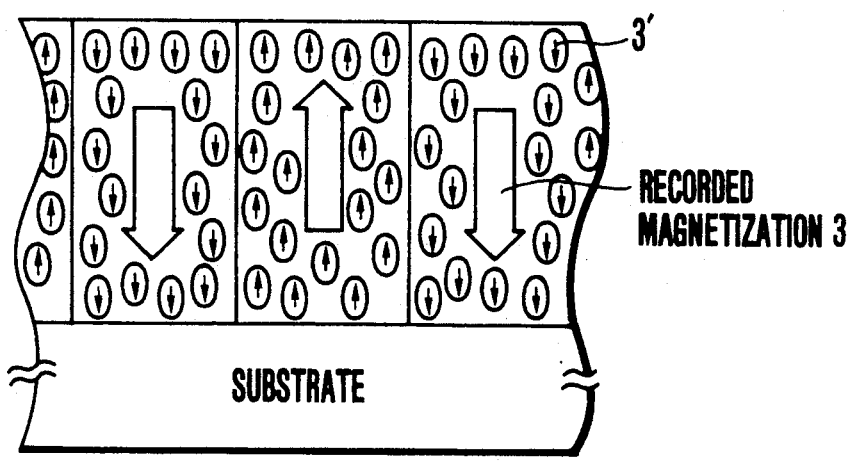
FIG. 2 is a schematic view of recorded magnetization states in a magnetic recording medium of the present invention.
Figure 3:
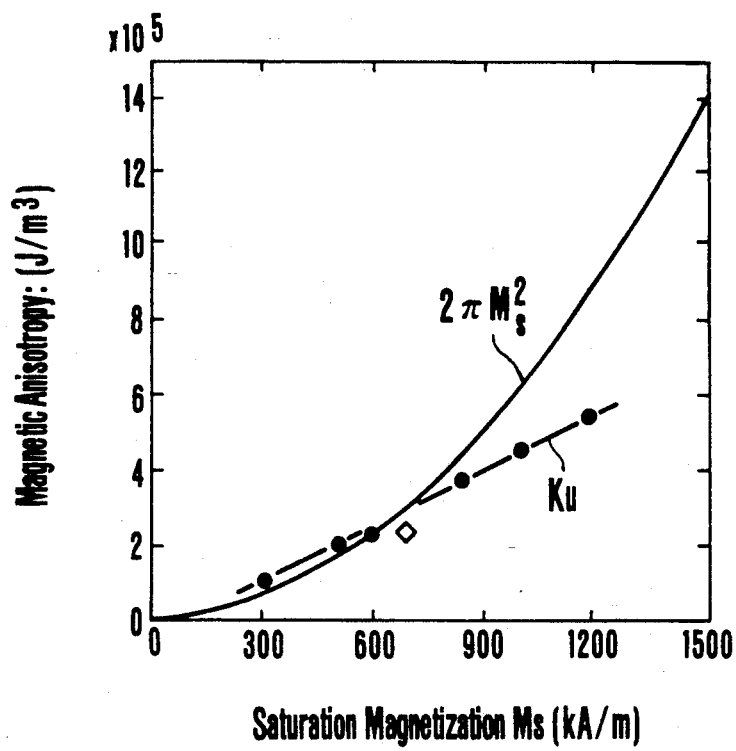
FIG. 3 shows dependence of perpendicular magnetic anisotropy energy of a Co-CoO evaporated film upon saturation magnetization.

FIG. 3 shows values of perpendicular magnetic anisotropy energy Ku of a partially oxidized Co film measured by using a torque magnetometer. As a result of measuring read-write characteristics of these partially oxidized Co films by using a magnetic head with gap length of 0.2 μm, values of normalized output at 10 kFCI, $E_{10k}$ (i.e., output value at single turn of winding, relative speed of 1 m/sec, track width of 1 μm and linear recording density of 10 kFCI) and 50% down recording density $D_{50}$ are summarized in FIG. 4.

Figure 4:
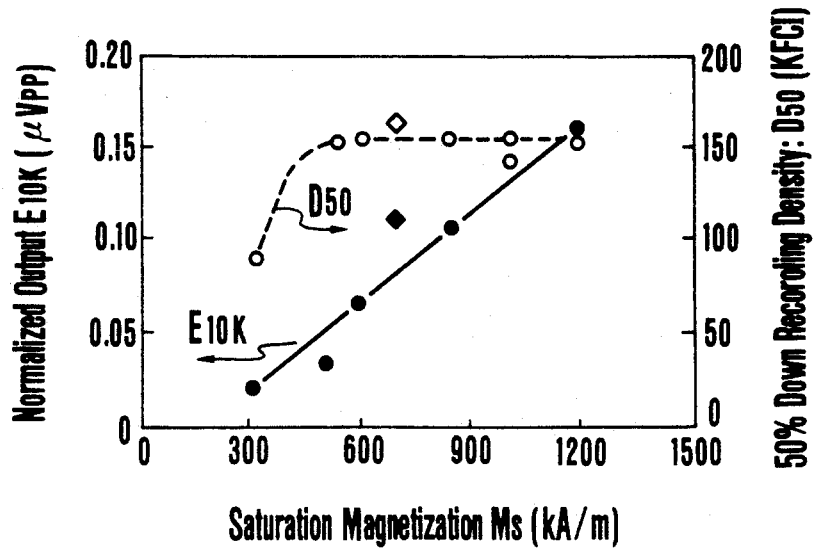
FIG. 4 shows read-write characteristics of a Co-CoO evaporated film.

As shown in FIG. 4, favorable read-write characteristics were obtained in a range of saturation magnetization Ms from 330 to 1200 kA/m. In case of Co-CoO evaporated films respectively having saturation magnetization Ms of 1000 kA/m and 1200 kA/m, values of perpendicular magnetic anisotropy energy Ku are approximately 0.8 and 0.6 of values of shape anisotropy energy $2\pi M_s^2$, respectively. Nevertheless, favorable perpendicular magnetic recording characteristics were obtained.

In the field of perpendicular magnetic recording, we have never had such a fact. It is guessed that this fact is caused by dispersion of ferromagnetic metal corpuscles in oxide and perpendicular magnetic anisotropy in a microscopic region.

tendency of finer corpuscles and reduction of coercive force was perceived when an element such as Al, Mn, Ta, Nb and Zr was added instead of Ti as well. When an element such as W, Mo, Pt, Ru and Re was added, a tendency of increase in coercive force was perceived.

Embodiment 2

Metal-oxide mixed evaporated films comprising Co-Fe alloys or Co-Ni alloys were fabricated by using a method similar to the method described with reference to the Embodiment 1 and by using Co-Fe alloys or Co-Ni alloys as raw materials of evaporation. Table 3 shows examples of magnetic characteristics of metal-oxide mixed evaporated films thus fabricated by using Co-Fe alloys or Co-Ni alloys

TABLE 3

| Sample No. | Composition of Fe or Ni with respect to total metal atoms | Saturation Magnetization Ms (kA/m) | In-Plane Coercive Force He∥ (kA/m) | Perpendicular Coercive Force Hc⊥ (kA/m) | Perpendicular Squareness Ratio (Mr/Ms)⊥ | Substrate Temperature in Evaporation (°C.) |
|---|---|---|---|---|---|---|
| CF-4 | Fe: 4 at % | 700 | 23.9 | 78.0 | 0.16 | 30 |
| CF-19 | Fe: 19 at % | 700 | 11.9 | 12.7 | 0.02 | 30 |
| CF-19H | Fe: 19 at % | 720 | 24.9 | 36.2 | 0.05 | 150 |
| CF-61 | Fe: 61 at % | 750 | 30.1 | 28.5 | 0.03 | 30 |
| CF-76 | Fe: 76 at % | 650 | 5.3 | 10.7 | 0.02 | 30 |
| CN-5 | Ni: 5 at % | 700 | 27.8 | 71.6 | 0.19 | 30 |
| CN-10 | Ni: 10 at % | 650 | 24.5 | 55.7 | 0.15 | 30 |
| CN-30 | Ni: 30 at % | 670 | 11.9 | 12.8 | 0.03 | 30 |

Figure 5A:
FIGS. 5(a) and 5(b) show a transmission electron microscope image of a section of a Co-CoO evaporated film.
Figure 5B:
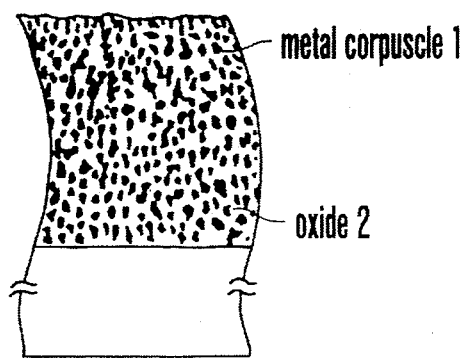

As an example showing the microscopic structure of the above described Co-CoO evaporated film, FIG. 5(a) shows a transmission electron microscope photograph of a Co-CoO evaporated film having a value of saturation magnetization Ms of 520 kA/m observed from the direction of section. FIG. 5(b) is a schematic view of the structure, wherein numeral 1 denotes a magnetic-metal corpuscle, and numeral 2 denotes its oxide matrix. Granular portions looking blackish in the photograph are images of metal Co corpuscles. Metal Co corpuscles having grain diameter of 10 nm to 30 nm are dispersed in the film almost uniformly. Unlike the columnar structure, this structure does not generate large shape magnetic anisotropy in the direction perpendicular to the film face. Therefore, it is considered that the shape magnetic anisotropy as found in the columnar structure is not the main cause of the perpendicular magnetic anisotropy of the partially oxidized Co film shown in the present embodiment, but the perpendicular magnetic anisotropy is generated in a microscopic region within the film, i.e., in the vicinity of metal corpuscles including oxide.

Figure 6A:
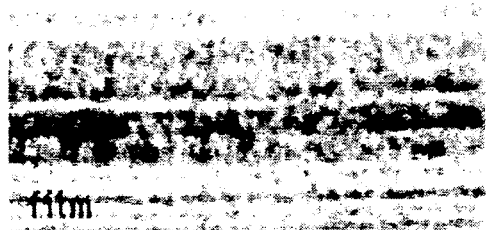
FIGS. 6(a) and 6(b) show a transmission electron microscope image of a section of a partially oxidized Co film with 3.5 at % Ti added thereto.
Figure 6B:
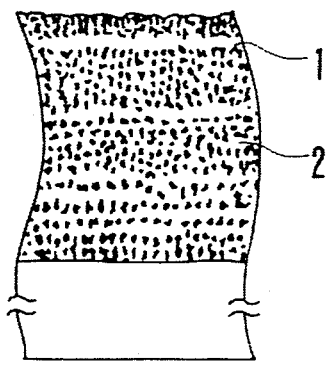

Typical examples of magnetic characteristics of a Co-CoO evaporated film obtained by adding 3.5 at % Ti with respect to Co to the above described Co-CoO evaporated film are represented by ◊ in FIG. 3. Read-write characteristic values are represented by ◊ or ♦ in FIG. 4. As shown in FIG. 4, read-write characteristics are improved by adding Ti. This is caused by the fact that the coercive force Hc⊥ in the perpendicular direction is reduced and the writing efficiency of a magnetic head is improved by addition of Ti. As shown in transmission electron microscope image of FIG. 6(a), corpuscles of the Co-CoO evaporated film with Ti added thereto become finer as compared with metal Co corpuscles in an Co-CoO evaporated film without anything added thereto as shown in FIG. 5(a). The diameter of a corpuscle in the film as shown in FIG. 6(a) is approximately 10 nm. FIG. 6(b) shows a schematic view of the structure in the same way as FIG. 5(b). The Under the condition that the substrate temperature in evaporation was 30° C. and the evaporation speed was 0.3 nm/sec in the same way as the embodiment 1, favorable magnetic characteristics were obtained when 4 at % Fe was added. In a metal-oxide mixed evaporated film of Co-Fe alloy comprising 19 at % to 76 at % Fe, the perpendicular coercive force Hc⊥ was as small as 30 kA/m or less and a favorable perpendicular magnetic recording medium was not obtained. As a result of fabricating a metal-oxide mixed evaporated film of Co-Fe alloy containing 19 at % Fe represented as sample No. CF-19H under the condition that the substrate temperature in evaporation was raised to 150° C., comparatively favorable magnetic characteristics as shown in Table 3 were obtained.

Figure 7:
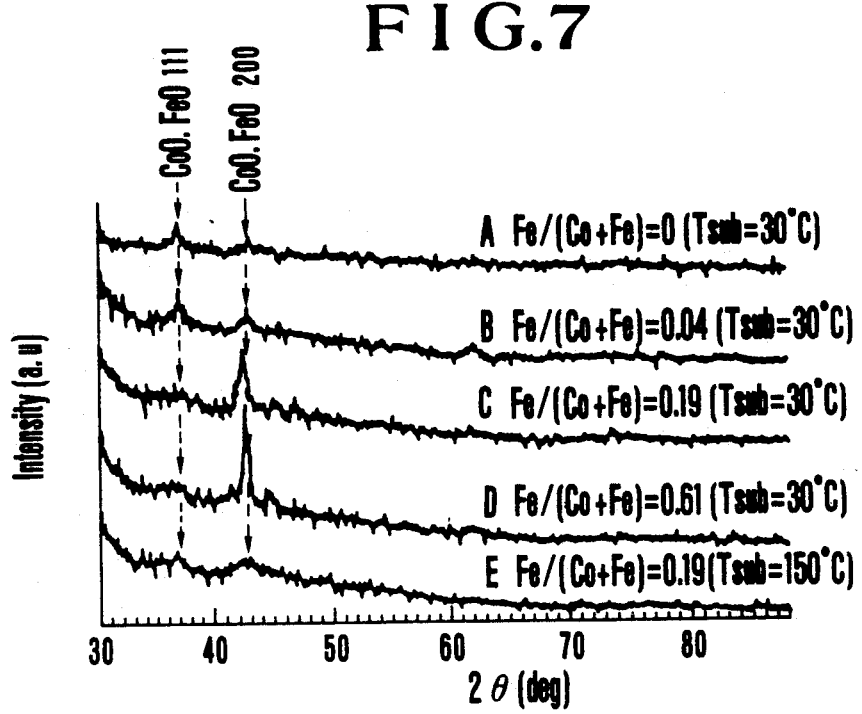
FIG. 7 shows X-ray diffraction patterns of a (Co, Fe)-(Co, Fe)O evaporated film.

FIG. 7 shows X-ray diffraction patterns of a Co-CoO evaporated film which does not contain Fe (curve A) and metal-oxide mixed evaporated films of Co-Fe alloys containing 4 at % Fe (curve B), 19 at % Fe (curve C) and 61 at % Fe (curve D). In partially oxidized films exhibiting favorable magnetic characteristics, 111 reflection of CoO, FeO or their mixed crystals appears more predominantly than 200 reflection as represented by curves A, B and E of FIG. 7. In partially oxidized films having small coercive force (Hc⊥) and exhibiting unfavorable magnetic characteristics, 200 reflection appears more predominantly than <111> reflection as represented by curves C and D. That is to say, it is known that <111> orientation of oxide such as CoO and FeO having a NaCl type structure is oriented in the direction perpendicular to the film face more preferentially than orientation <100> in case of films in which perpendicular magnetic anisotropy is generated.

In a metal-oxide mixed evaporated film of Co-Fe alloy containing 4 at % Fe and metal-oxide mixed evaporated films of Co-Ni alloys respectively containing 5 at % Ni and 10 at % Ni as well, excellent read-write characteristics similar to those shown with reference to the embodiment 1 were obtained.

Embodiment 3

Metal-oxide mixed evaporated films of Fe and Fe-Ni alloy were fabricated by using a method similar to that described with reference to the Embodiment 1 and by using Fe and Fe-Ni ally as raw materials of evaporation. For comparison with the prior art examples, the evaporation speed of Fe and Fe-Ni alloy was set at 200 nm/sec (the prior art) and 0.3 nm/sec (the present embodiment). The substrate temperature at the time of evaporation was set at 30° C. In all films, the amount of introduced oxygen gas was suitably adjusted so that saturation magnetization Ms might be 800 kA/m. Further, the content of Ni contained in films fabricated in the present embodiment was 5 at % with respect to the sum of Fe and Ni.

Magnetic characteristics of metal-oxide mixed evaporated films of Fe and Fe-Ni alloy thus fabricated are shown in Table 4.

TABLE 4

Magnetic Characteristics of Metal-Oxide Mixed Evaporated Films of Fe and Fe—Ni alloy

| Metal Raw Material | Evaporation Speed (nm/sec) | In-plane Coercive Force $Hc\parallel$ (kA/m) | Perpendicular Coercive Force $Hc\perp$ (kA/m) |
|---|---|---|---|
| Fe | 0.3 | 28.0 | 52.0 |
|  | 100 | 24.0 | 25.2 |
| Fe—Ni Alloy | 0.3 | 26.4 | 50.8 |
|  | 100 | 21.3 | 24.2 |

In case of metal-oxide mixed evaporated films of Fe and Fe-Ni alloy, the perpendicular coercive force $Hc\perp$ is smaller than that of films mainly comprising Co described in the Embodiments 1 and 2, resulting in inferior characteristics. However, it is known that the perpendicular coercive force $Hc\perp$ is increased to twice or more and the perpendicular magnetic anisotropy is significantly improved by making the evaporation speed as show as 0.3 nm/sec as compared with the prior art example having the evaporation speed of 200 nm/sec.

Embodiment 4

Figure 21:
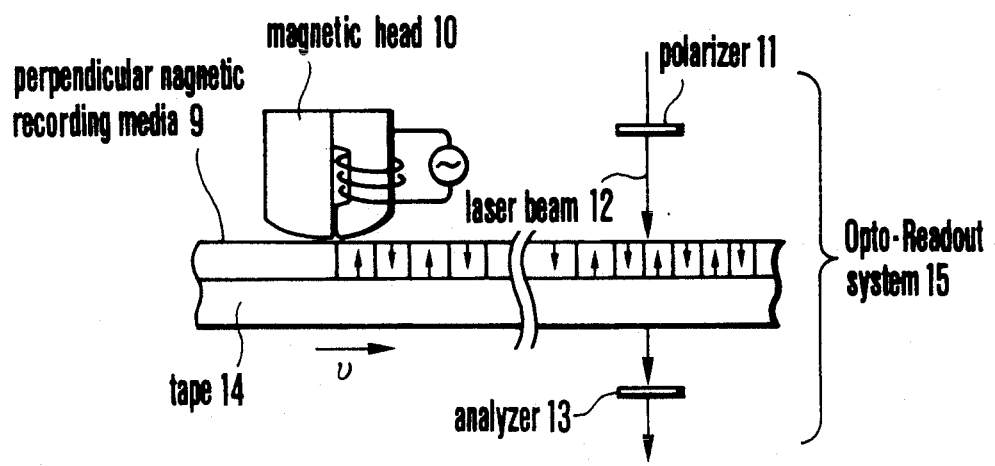
FIG. 21 is a schematic view of an optical magnetic read-write machine using a perpendicular magnetic recording medium of the present invention.

FIG. 21 schematically shows a machine in case a perpendicular magnetic recording medium according to the present invention is applied for optical magnetic read-write operation. In the machine, a perpendicular magnetic recording medium 9 formed on tape 14 having good light transparency as shown in FIG. 21 is mounted to tape transport mechanism (not illustrated). The machine further includes a magnetic head 10 for writing signals and an opto-readout system 15 which in turn comprises a polarizer 11, a laser beam 12 and an analyzer 13. The perpendicular magnetic recording medium 9 was fabricated under the same condition as that of the Embodiment 1. As for magnetic characteristics of the perpendicular magnetic recording medium 9 thus fabricated, the saturation magnetization Ms was 520 kA/m, the perpendicular coercive force $Hc\perp$ 72 kA/m and the perpendicular squareness ratio $(Mr/Ms)\perp$ 0.19. Further, the magnetic head 10 used for writing signals had gap length of 0.5 μm and track width of 5 μm. Further, the light source used in the opto-readout system was a semiconductor laser having wavelength of 830 nm, and the laser beam was condensed to spot diameter of 1 μm.

When signals were written by using the magnetic head and the signals were read by using the opto-readout system to evaluate the read-write characteristics, favorable characteristics having an S/N ratio of approximately 45 dB (noise bandwidth 30 kHz) were obtained at bit length of 0.7 μm.

Embodiment 5

By using a vacuum evaporation apparatus shown in FIG. 20, evaporation of Co was performed while introducing a very small amount of oxygen. Metal Co was melted by using the electron beam heating method (crucible 6) and the filament current was so adjusted that the evaporation speed may be approximately 1 nm/sec. By adjusting the amounts of introduced oxygen by means of the needle valve 8 to change the partial pressure of oxygen in a range of $3\times10^{-3}$ to $10^{-2}$ Pa, samples having various saturation magnetization values were fabricated. That is to say, the magnitude of the partial pressure of oxygen is contradictory to the magnitude of saturation magnetization Ms as well known. Therefore, Ms is decreases as the partial pressure is increased and Ms is increased as the partial pressure is decreased. Accordingly, adjustment of saturation magnetization was performed by controlling the partial pressure to a value suited to the sample. A polyimide film having thickness of 20 μm was used as the substrate 4. Further, the substrate temperature was set at 30° C. Under such a condition, 7 kinds of Co-Co oxide mixed perpendicular magnetic films (sample No. 1 to 7) having film thickness of 250 nm and different saturation magnetization values were fabricated. Magnetic characteristics of these samples were measured by using a vibrating sample magnetometer. The results of measurement are shown in Table 5.

Symbols $\perp$ and $\parallel$ in Table 5 indicate that the applied magnetic film is in the direction perpendicular to the film and in the in-plane direction, respectively. Since the value of saturation magnetization Ms somewhat decreases with the advance of heat treatment, values of Ms measured after heat treatment are also shown in Table 5.

TABLE 5

| Sample No. | Ms (kA/m) | Coercive Force Hc (kA/m) | | Squareness Ratio (Mr/Ms) | | Shape of Magnetization Curve | | Ms after Heat Treatment (kA/m) |
|---|---|---|---|---|---|---|---|---|
|  |  | $\perp$ | $\parallel$ | $\perp$ | $\parallel$ | Before Heat Treatment | After Heat Treatment |  |
| 1 | 1,300 | 40 | 20 | 0.06 | 0.5 | C R = 20 | C R = 18 | 1290 |
| 2 | 1,130 | 62 | 35 | 0.13 | 0.22 | A | A | 1050 |
| 3 | 855 | 139 | 56 | 0.18 | 0.20 | B R = 2 | A | 800 |
| 4 | 730 | 90 | 23 | 0.16 | 0.15 | B R = 9 | A | 700 |
| 5 | 600 | 99 | 39 | 0.17 | 0.17 | B R = 10 | A | 550 |

TABLE 5-continued

| Sample No. | Ms (kA/m) | Coercive Force Hc (kA/m) ⊥ | ∥ | Squareness Ratio (Mr/Ms) ⊥ | ∥ | Shape of Magnetization Curve Before Heat Treatment | After Heat Treatment | Ms after Heat Treatment (kA/m) |
|---|---|---|---|---|---|---|---|---|
| 6 | 520 | 85 | 20 | 0.16 | 0.13 | C R = 15 | B R = 2 | 492 |
| 7 | 310 | 40 | 30 | 0.10 | 0.09 | C R = 57 | C R = 32 | 280 |

Figure 8:
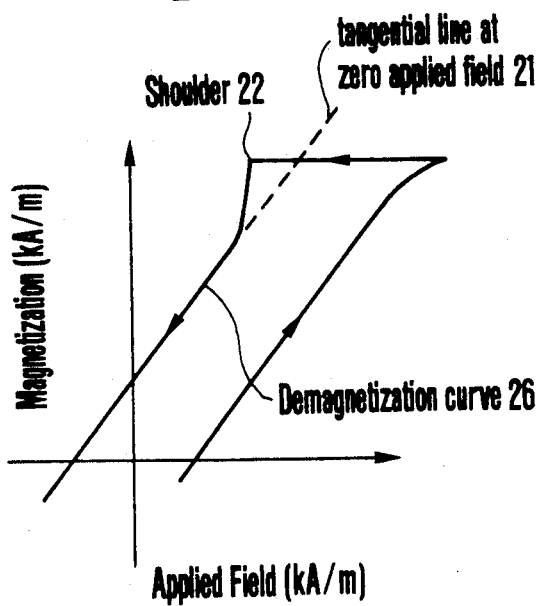
FIG. 8 shows a magnetization curve of a perpendicular magnetic film according to the present invention measured in a direction perpendicular to the film face.
Figure 9:
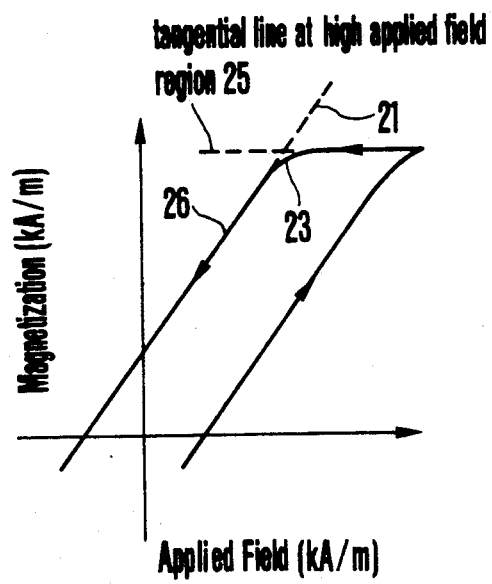
FIG. 9 shows another example of a magnetization curve of a perpendicular magnetic film according to the present invention measured in a direction perpendicular to the film face.
Figure 10:
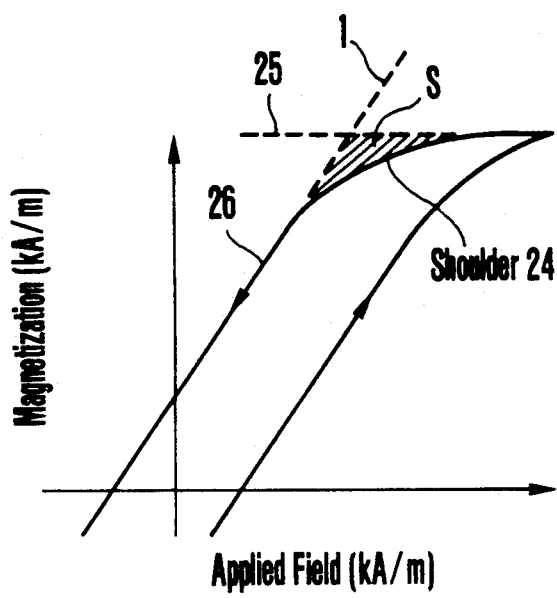
FIG. 10 shows a magnetization curve of a perpendicular magnetic film of the prior art for the purpose of comparison.

In the Table 5, types A, B and C representing shapes of magnetization curves of respective sample are also shown. Type A refers to the shape of FIG. 8 showing an embodiment of the present invention. Type B refers to the shape of FIG. 9 showing an embodiment of the present invention. Type C refers to the shape of FIG. 10 showing the prior art example. For types B and C, R=S/Ms (kA/m) obtained by dividing the area S of the shaded region shown in FIG. 10 by saturation magnetization Ms is also shown in order to represent the degree of squareness of the shoulder section. The smaller the value of R, the more excellent the squareness. It will be described later by referring to Embodiment 6 that types A and B having R=10 kA/m or less meet the object of the present invention.

Figure 14:
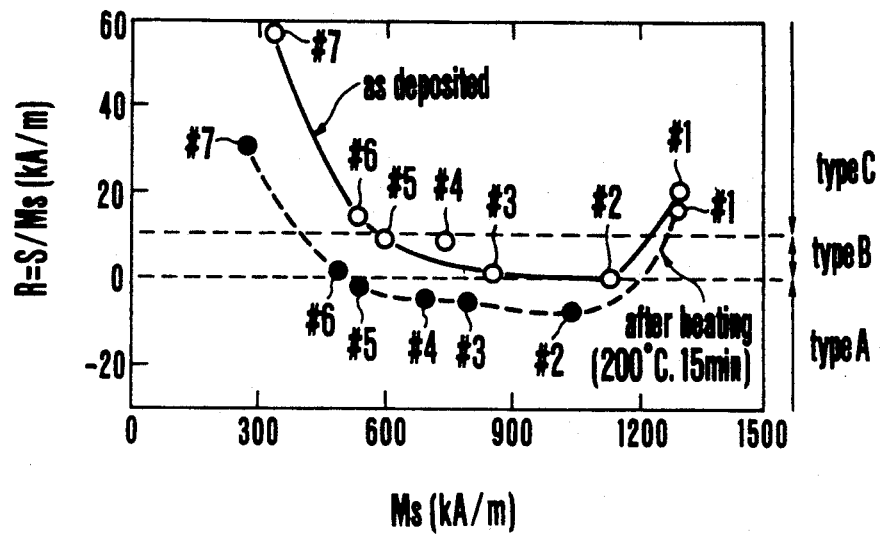
FIG. 14 shows dependence of the value of R=S/Ms upon saturation magnetization before heat treatment and after heat treatment.

As evident from Table 5, the sample Nos. 2, 3, 4 and 5 are excellent in squareness, and their magnetization curves are type A or B even before heat treatment as shown in FIG. 14. On the other hand, the sample No. 6 is type C before heat treatment, but becomes type B after heat treatment. Its R value is also improved from 15 to 2. The sample Nos. 1 and 7 remain type C even after heat treatment, resulting in insufficient characteristics.

In this case, the value of Ms making the value of R not larger than 10 kA/m ranges from 600 kA/m to 1130 kA/m before heat treatment and ranges from 492 kA/m to 1050 kA/m after heat treatment.

For each sample, heat treatment was performed in the air at 200° C. for 15 minutes. As a result of heat treatment, a significant change was not observed in microscopic magnetic characteristics. For the sample Nos. 2 to 6, however, a change was observed in the shape of the magnetization curve and the squareness of the shoulder section became more square as described above.

Embodiment 6

Disk-shaped portions were cut out from the samples fabricated in the above described embodiment 5 and their read-write characteristics were evaluated. A magnetic head of MIG (metal in gap) type comprising an amorphous Co-Nb-Zr thin film put between Mn-Zn ferrite blocks was used. The gap length of the magnetic head was 0.2 μm. Read-write characteristics were measured at relative speed of 2 m/sec under the condition that a lubricant was applied onto the surface of the medium and the magnetic head was in contact with the surface.

Figure 11:
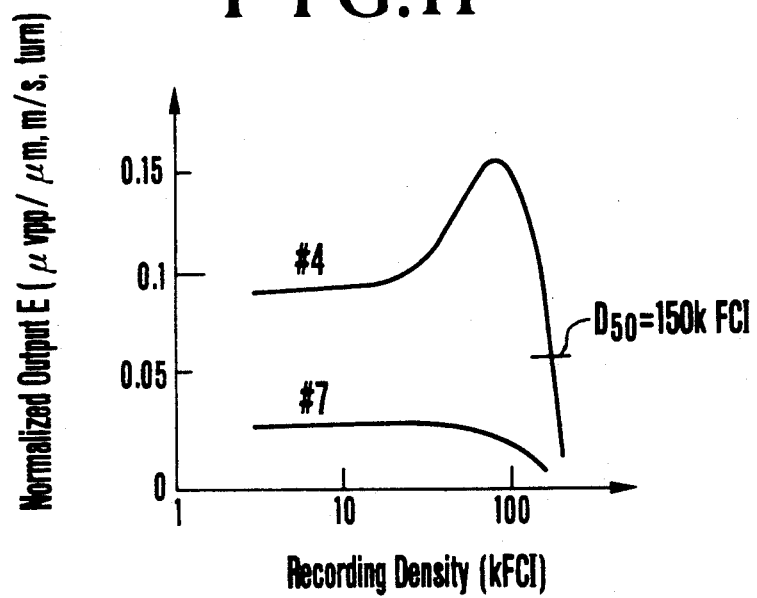
FIG. 11 shows dependence of readout output of a perpendicular magnetic film upon recording density in case of the present invention and the prior art.

In order to show difference between read-write characteristics of types A and B and those of type C, dependence of reproduced output of the sample N. 4 of type B and the sample No. 7 of type C (without heat treatment) upon recording density is shown in FIG. 11. The sample No. 4 having an acute-angled magnetization change in the shoulder section of the magnetization curve exhibits a higher readout output in the high density region, and its 50% down recording density ($D_{50}$) is also as excellent as 150 kFCI. In the sample No. 4, the isolated output waveform is a di-pulse, showing that typical perpendicular magnetic recording is performed. In the sample No. 7, the isolated output waveform is a single pulse, and perpendicular magnetic recording is not performed.

Figure 12:
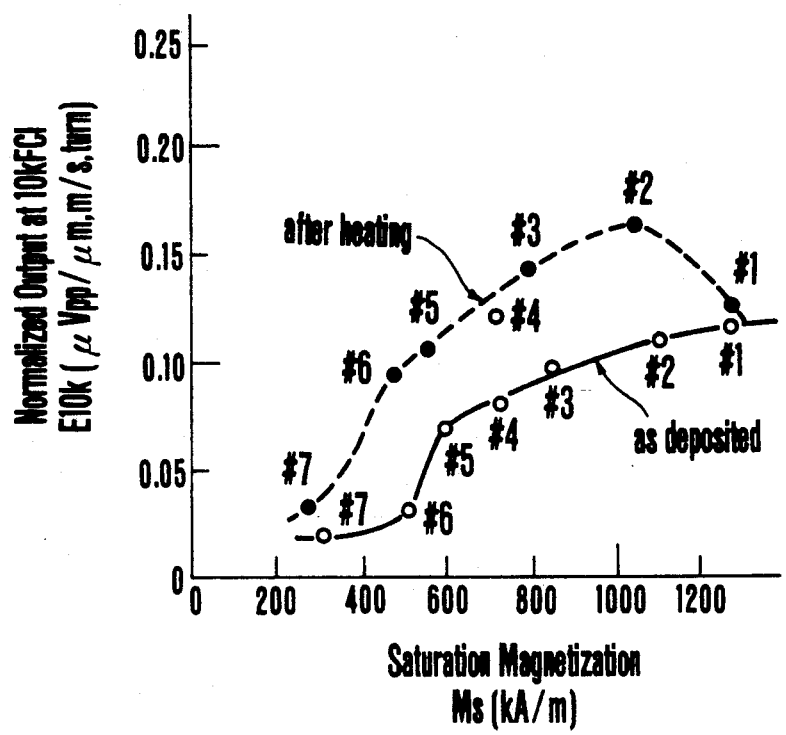
FIG. 12 is a characteristic curve diagram showing the relation between saturation magnetization of a perpendicular magnetic film according to the present invention and the normalized readout output thereof at a low frequency.
Figure 13:
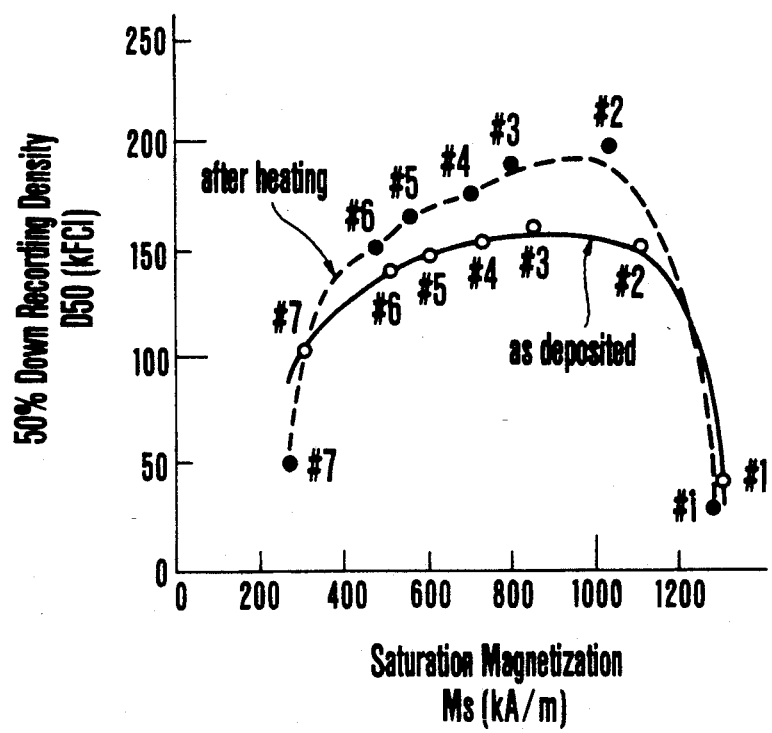
FIG. 13 is a characteristic curve diagram showing the relation between saturation magnetization of a perpendicular magnetic film according to the present invention and 50% down recording density thereof.

The relation between saturation magnetization and readout output ($E_{10k}$) at linear recording density 10 kFCI of the sample Nos. 1 to 7 as deposited and after heating is shown in FIG. 12, whereas the relation between their saturation magnetization and 50% down linear recording density ($D_{50}$) is shown in FIG. 13.

In order to realize a digital video tape recorder (D-VTR), it is desired that the linear recording density is not lower than 100 kFCI and the normalized output is not lower than 0.05 μVpp. It is considered that $E_{10k}$ must be not less than 0.07 μVpp/μm, m/s, turn and $D_{50}$ must be not less than 140 kFCI for that purpose.

As for samples as deposited (as represented by solid lines), it is understood that the sample Nos. 2, 3, 4 and 5 satisfy the criterion that $E_{10k}$ should be not less than 0.07 μVpp and $D_{50}$ should be not less than 140 kFCI. As for samples after heating, read-write characteristics are improved in all samples excepting sample Nos. 1 and 7. The sample No. 6 does not meet criterion values of both characteristics before heating. However, the sample No. 6 satisfies the criterion after heating.

FIG. 14 shows values of these samples as deposited and after heating. The coordinate represents the value of R and the abscissa represents the value of Ms. It is recognized that all samples satisfying both criterion values in FIGS. 12 and 13 have R values of 10 kA/m or less.

Especially in the sample No. 6, improvement of characteristics by heat treatment is significant. This is caused by the fact that the shape of the magnetization curve changes from the type C to the type B and the change in the shoulder section becomes more acute.

Figure 15:
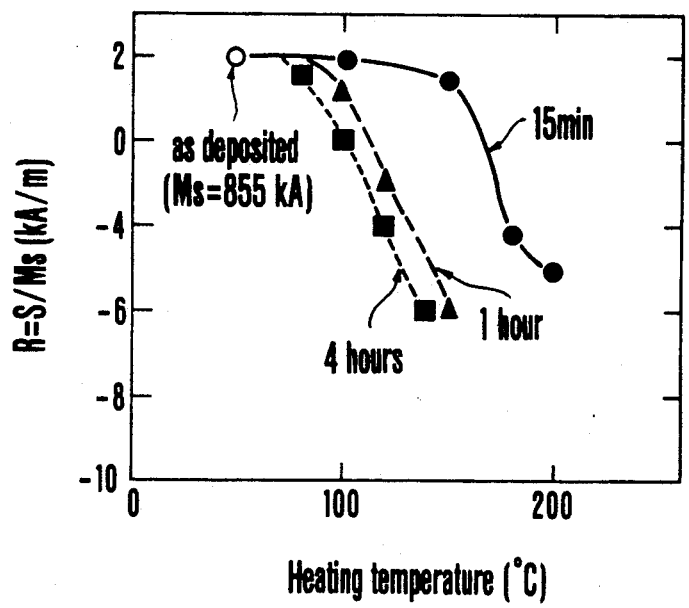
FIG. 15 shows dependence of the R value of a Co-CoO evaporated film having saturation magnetization of 855 kA/m and R value of 2 kA/m before heat treatment upon heating temperature measured for various heat treatment durations.

FIG. 15 shows the change of the value of R of the sample No. 3 observed when various heat treatments are applied under the condition that the temperature and time of heat treatment are varied. From FIG. 15, it is understood that the value of R decreases and the squareness is improved by heat treatment.

Embodiment 7

Examples in which perpendicular magnetic films according to the present invention are applied to an optical magnetic read-write machine will now be described.

As shown in FIG. 21, a machine comprising tape transport mechanism (not illustrated), the magnetic head 10 for writing signals, and the opto-readout system having the polarizer 11, the laser beam 12 and the analyzer 13 was fabricated. The recording medium was fabricated under the same condition as that of the embodiment 5 with the exception that the partial pressure of oxygen was $9 \times 10^{-3}$ Pa and the film thickness was 50 nm. Heat treatment was also applied to the magnetic film in the air at 200° C. for 15 minutes. Magnetic characteristics of the fabricated sample were represented as Ms=600 kA/m, coercive force Hc⊥=72 kA/m, Hc∥ =25 kA/m, squareness ratio (Mr/Ms)⊥=0.2, (Mr/Ms)∥ =0.1 and R=2 kA/m. The shape of the shoulder section of the magnetization curve was type B as shown in FIG. 9. The type of the magnetic head used was the same as that of aforementioned one. Its gap length and track width were set at 0.5 μm and 5 μm, respectively. In optical magnetic recording, the track width of approximately 1 μm is sufficient. It is desirable that the track width is narrow. In the present embodiment, however, the track width was defined to be approximately 5 μm for convenience of head working. The light source (not illustrated) used in the opto-readout system is semiconductor laser having wavelength of 830 nm, and the beam is condensed to spot diameter of 1 μm.

Tape-shaped portions were cut out from recording medium samples, and their read-write characteristics were evaluated by using the fabricated optical magnetic read-write machine. At bit length of 0.7 μm, the signal-to-noise ratio was approximately 45 dB (under the condition that noise bandwidth was 30 kHz), favorable characteristics being thus obtained.

In the present embodiment, signals were read out by using the Faraday effect utilizing the light transmitted through the recording medium. If a readout scheme using the Kerr effect is employed, however, the film thickness of the magnetic film can be made 0.1 μm or more because reflected light is used. Even from relatively long bit length, therefore, it can be expected that the demagnetizing field is decreased, and the amount of written magnetization advantageously increases. Further, use of the Kerr-effect readout scheme also brings about merits described below. In the present embodiment, signal recording was performed by using a ring type head. However, it becomes possible to use a so-called double-layered film medium having a high permeability layer such as permalloy between a magnetic layer and the substrate. If signal recording is performed by using a heat of single pole type in this case, more ideal perpendicular magnetic recording becomes possible, and high signal-to-noise ratio can be obtained.

In case a double-layered medium is used, the high permeability layer can be used as a light reflection layer. In case the thickness of the magnetic layer is made thin the enhancement of Kerr effect can be expected.

A magnetic film according to the present invention has sufficiently strong wear-resistant properties. If a protective film such as carbon, boron, carbide, nitride or boride is formed on the surface of the magnetic film, however, much stronger recording medium can be obtained. Especially in optical magnetic recording, the recording bit length is comparatively long. Therefore, the magnetic recording is possible even when the protective film thickness is not less than 50 nm, if the protective film transmits light.

Embodiment 8

Figure 16:
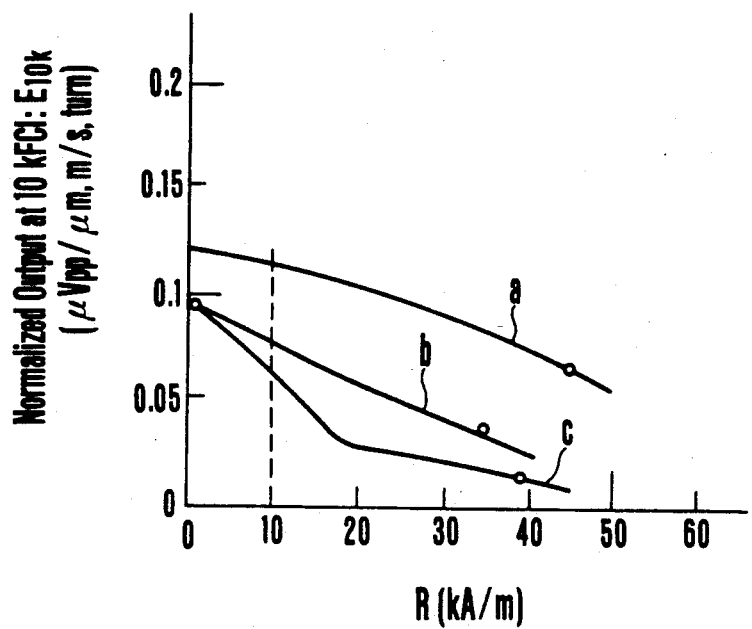
FIG. 16 is a characteristic curve diagram showing the relation between the R value and readout output.

FIG. 16 shows the relation between the value of R=S/Ms representing the shape of the shoulder section of the magnetization curve and the normalized output at 10 kFCI ($E_{10k}$). Magnetic films of samples were fabricated in the same way as the Embodiment 5. Curve a represents measured values of samples having saturation magnetization Ms ranging from 800 to 1100 kA/m. Curve b represents measured values of samples having saturation magnetization Ms ranging from 600 to 800 kA/m. Curve c represents measured values of samples having saturation magnetization Ms ranging from 400 to 600 kA/m.

Figure 17:
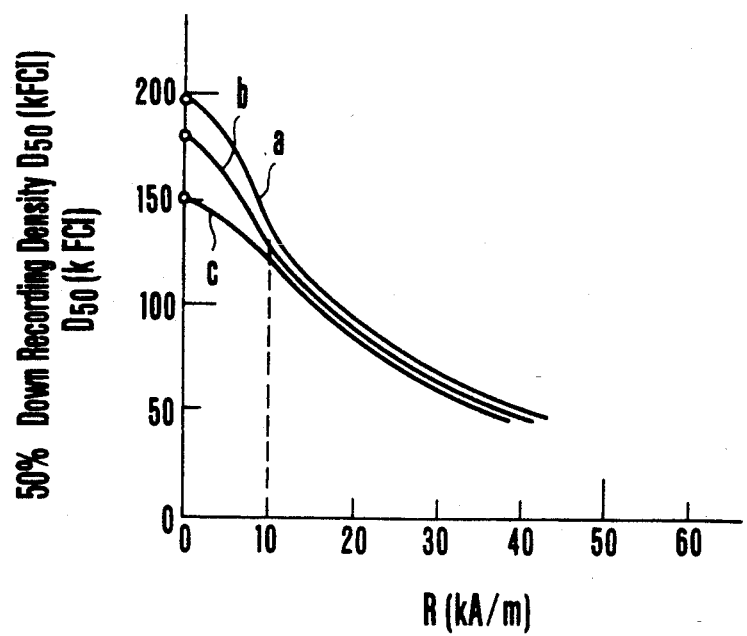
FIG. 17 is a characteristic curve diagram showing the relation between the R value and 50% down recording density.

FIG. 17 shows the relation between the value of R and 50% down recording density $D_{50}$. Curves a, b and c represent measurement results of the same samples as those of FIG. 16, respectively.

In order to realize a digital video tape recorder (D-VTR), it is desired that the linear recording density is not less than recording density is not less than 100 kFCI and the normalized output is not less than 0.05 μVpp. It is considered that $E_{10k}$ must be not less than 0.07 μVpp/pm, m/sec, turn and $D_{50}$ must be not less than 140 kFCI in order to satisfy the above described conditions. It is understood from FIGS. 14 and 15 that the value of R must be not more than 10 kA/m. Here, measurement conditions of read-write characteristics are the same as those of the Embodiment 6.

Figure 18:
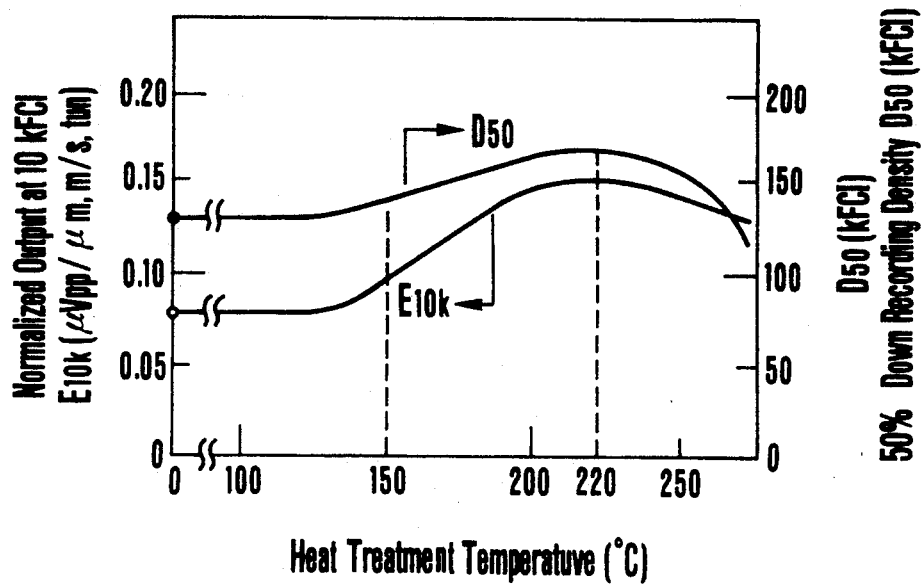
FIG. 18 is a characteristic curve diagram showing the relation between heat-treatment temperature of a magnetic film and readout output thereof.

FIG. 18 shows the relation between heat treatment applied to the magnetic film after evaporation and read-write characteristics. The sample was fabricated in the same way as the Embodiment 5. The saturation magnetization Ms at the time of film forming is 730 kA/m. As evident from FIG. 18, both $E_{10k}$ and $D_{50}$ are improved when the heat treatment temperature becomes 150° C. or higher. They are maximized near the heat treatment temperature of 200° C. If the heat treatment temperature becomes too high, however, Ms tends to change and distortion is caused between the magnetic film and the substrate. Further, heat resistance poses a problem when the substrate comprises resin. For practical use, therefore, the upper limit of the heat treatment temperature becomes approximately 220°.

In the embodiments heretofore described, Co-CoO mixed perpendicular magnetic films are taken as examples. However, it was confirmed that effects similar to those of the above described embodiment were obtained even in magnetic films comprising magnetic metal such as Fe or Ni added to Co. Even when nonmagnetic Ti, Cr, Mn, Cu, Zr, V, Al, Mo, W, Re, Ru, Rt, Nb or Bi was added to Co as an additive element, similar effects were observed. In particular, it was confirmed that Bi also had function to improve the photomagnetic effect.

By using the property of a magnetic film according to the present invention that it transmits light sufficiently with thickness of approximately 50 nm and the property thereof that it has a photomagnetic effect, a magnet-optical recording machine having a system of magnetic head writing and optical readout is realized.

Embodiment 9

By using the vacuum evaporation apparatus shown in FIG. 20 and a well-known technique, partially oxidized Co film was formed on the polyimide substrate 4. Co was dissolved by using the electron beam heating method and crucible 2 and evaporated. Further, the amount of introduced oxygen for performing partial oxidization was adjusted by using the needle value 8.

As for the evaporation conditions, the substrate temperature was set at 30° C. and the evaporation speed of Co was set at 0.3 nm/sec, whereas the partial pressure of oxygen was set at $9 \times 10^{-3}$ Pa. Under these conditions, partially oxidized Co film having film thickness of 240 nm was fabricated and underwent heat treatment in air at temperature of 215° C. for one hour. Magnetic characteristics as deposited were then compared with those after heating.

Figure 19:
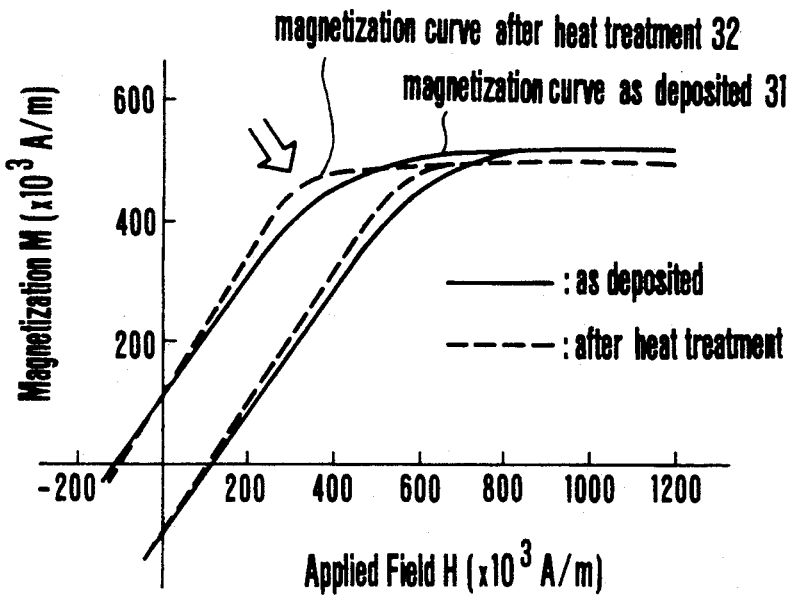
FIG. 19 shows the first quadrant of magnetization hysteresis curves of a Co-CoO evaporated film fabricated according to the present invention with solid lines showing curves before heat treatment and broken lines showing curves after heat treatment.

FIG. 19 shows the first quadrant of the magnetization hysteresis curve of the film as deposited and after heating. In either case, a magnetic field is applied to the film in a direction perpendicular to the film face. Numeral 31 denotes a magnetization hysteresis curve of the film as deposited, and numeral 32 denotes a magnetization hysteresis curve of the film after heating.

Before heat treatment, Ms of the Co-CoO evaporated film was $5.16 \times 10^5$ A/m and the coercive force thereof (Hc⊥) was $9.51 \times 10^4$ A/m. It is considered that decrease of approximately 0.2% in Ms observed after heating is caused by the fact that oxygen of supersaturation in the partially oxidized film reacts with metal Co to form Co-O oxide and the density of metal Co in the film is substantially decreased. Such a decrease in Ms was also observed in heat treatment in vacuum having pressure of $1.3 \times 10^{-4}$ Pa.

In FIG. 19, a large difference between the magnetization hysteresis curve of the film as deposited and that of the film after heating is found in shoulder sections of the hysteresis curves indicated by an arrow. Before the heat treatment, this shoulder section is gently-sloping and indicates that the magnetization inversion with respect to a field change in this region is not uniform. After the heat treatment, however, the shoulder section is sharp and indicates that the magnetization inversion with respect to a field change in this region is uniform and steep.

Read-write characteristics of Co-CoO evaporated films thus fabricated were measured at linear recording density 80 kFCI before and after heat treatment by using a magnetic head with gap length of 0.3 μm. Whereas the output of the sample as deposited is 1.5 μVpp under the condition that the winding had a single turn and the relative speed was 1 m/sec, the output of the sample became 3 μVpp, the output being advantageously increased to twice.

In Co-CoO evaporated films used in the present embodiment, the change of magnetization hysteresis curve as shown in FIG. 19 was observed at the heating temperature not lower than 150° C. For all samples having magnetization curves thus changed, it was confirmed that read-write characteristics were improved. In the present embodiment, Co-CoO evaporated films were described. Even in Co-CoO evaporated films each containing 0.1 to 1.5 at % in total of one or two kinds of elements selected out of elements Ti, Mn, Zr, Cr, Al, Pt, Nb, Ru, Re and Fe, a change of magnetization curve similar to that shown in FIG. 19 was observed.

A magnetic recording media according to the present invention has excellent perpendicular magnetic read-write characteristics and is capable of satisfying intended objects. Further, this magnetic recording medium is simple in fabrication method and can be fabricated at room temperature, and hence it can be formed on a substrate having poor heat resistance. Even when a magnetic recording medium having saturation magnetization not lower than 1000 kA/m is fabricated, perpendicular magnetic recording is possible as described with reference to embodiments, resulting in a high read-write output. Since the diameter of the magnetic metal corpuscle is small, a high signal-to-noise ratio and high density magnetic recording can be expected, merits in practical use being significant.

In the described embodiments, a perpendicular magnetic recording medium is fabricated directly on a substrate by using the evaporation method. Even when a method of evaporating metal Co in oxygen gas, fabricating metal Co corpuscles having surfaces covered by CoO and coating the powders onto a film is used, for example, however, a perpendicular magnetic recording medium having excellent characteristics can be obtained.

As examples of application of a magnetic recording medium according to the present invention to an magnet-optical recording machine, machines using the Faraday effect have been described in embodiments. However, the Kerr effect may also be used. By using a magnetic recording medium according to the present invention, a magnet-optical recording machine performing signal writing by means of a magnetic head and signal recording by means of light can thus be realized.

What is claimed is:

1. A perpendicular magnetic recording medium comprising a perpendicular magnetic film for magnetic recording including a mixture having at least cobalt and its oxide which is provided either directly, or through an intervening high permeability layer, on a non-magnetic substrate having a predetermined shape, said perpendicular magnetic film having a magnetization/demagnetization curve when subjected to a magnetic field applied in the perpendicular direction to the surface of the magnetic film, such that when a tangential line is drawn in the vicinity of a zero applied field relative to the demagnetization curve of the magnetization curve at a first quadrant thereof, a shoulder of the demagnetization curve intersects the tangential line.

2. A perpendicular magnetic recording medium comprising a perpendicular magnetic film for magnetic recording including a mixture having at least cobalt and its oxide which is provided either directly, or through an intervening high permeability layer, on a non-magnetic substrate having a predetermined shape, said perpendicular magnetic film having a magnetization/demagnetization curve when subjected to a magnetic field applied in the perpendicular direction to the surface of the magnetic film, such that when a first tangential line is drawn in the vicinity of a zero applied field relative to the demagnetization curve at a first quadrant thereof, and a second tangential line is drawn at a region of high magnetic field, a magnetization value $R = S/M_s$ is less than 10 kA/m, wherein S is an area surrounded on three sides with the first and second tangential lines and a shoulder of the demagnetization curve, and $M_s$ is the saturation magnetization.

* * * * *